(12) United States Patent
Kim et al.

(10) Patent No.: US 10,567,990 B2
(45) Date of Patent: Feb. 18, 2020

(54) METHOD AND APPARATUS FOR PERFORMING MEASUREMENT USING PERMISSION LIST BY TERMINAL IN WHICH MULTIPLE CARRIERS ARE SET

(71) Applicant: Samsung Electronics Co., Ltd, Suwon-si (KR)

(72) Inventors: Soenghun Kim, Suwon-si (KR); Himke Van Der Velde, Zwolle (NL); Sangbum Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/757,287

(22) PCT Filed: Sep. 5, 2016

(86) PCT No.: PCT/KR2016/009896
§ 371 (c)(1),
(2) Date: Mar. 2, 2018

(87) PCT Pub. No.: WO2017/039415
PCT Pub. Date: Mar. 9, 2017

(65) Prior Publication Data
US 2018/0249362 A1    Aug. 30, 2018

Related U.S. Application Data

(60) Provisional application No. 62/214,541, filed on Sep. 4, 2015.

(51) Int. Cl.
*H04W 24/10* (2009.01)
*H04W 4/70* (2018.01)

(52) U.S. Cl.
CPC ............. *H04W 24/10* (2013.01); *H04W 4/70* (2018.02)

(58) Field of Classification Search
CPC ..................................................... H04W 24/10
See application file for complete search history.

(56) References Cited

U.S. PATENT DOCUMENTS

2011/0103249 A1    5/2011 Kim et al.
2012/0015681 A1    1/2012 Dalsgaard et al.
(Continued)

FOREIGN PATENT DOCUMENTS

WO         2014/126345 A1    8/2014

OTHER PUBLICATIONS

Supplementary European Search Report dated May 16, 2018 in connection with European Patent Application No. 18 84 2381.
(Continued)

*Primary Examiner* — Samina F Choudhry

(57) ABSTRACT

The present disclosure relates to a communication technique for combining a 5G communication system for supporting a higher data transmission rate than a 4G system with an IoT technology, and a system therefor. The present disclosure can be applied to 5G communication and IoT related technology-based intelligent services (for example, smart homes, smart buildings, smart cities, smart cars or connected cars, health care, digital education, retail businesses, security and safety related services, etc.). More specifically, a method for reporting measurement of a terminal according to the present invention comprises the steps of: receiving, from a base station, a measurement setting message instructing measurement for a neighboring cell; performing measurement for first cells selected on the basis of the measurement setting message; and determining, on the basis of the measurement setting message, whether to initiate a measurement
(Continued)

report procedure according to measurement results for second cells selected.

15 Claims, 8 Drawing Sheets

(56) References Cited

U.S. PATENT DOCUMENTS

| | | |
|---|---|---|
| 2012/0076041 A1 | 3/2012 | Hoon et al. |
| 2012/0178451 A1 | 7/2012 | Kubota et al. |
| 2013/0077515 A1 | 3/2013 | Jung et al. |
| 2014/0086173 A1 | 3/2014 | Pourlya et al. |
| 2014/0105166 A1 | 4/2014 | Yamada et al. |
| 2014/0247741 A1 | 9/2014 | Yamada |

OTHER PUBLICATIONS

International Search Report dated Nov. 30, 2016 in connection with International Patent Application No. PCT/KR2016/009896.
Written Opinion of the International Searching Authority dated Nov. 30, 2016 in connection with International Patent Application No. PCT/KR2016/009896.

METHOD AND APPARATUS FOR PERFORMING MEASUREMENT USING PERMISSION LIST BY TERMINAL IN WHICH MULTIPLE CARRIERS ARE SET

CROSS-REFERENCE TO RELATED APPLICATION(S)

This application is a 371 of International Patent Application No. PCT/KR2016/009896 filed Sep. 5, 2016, which claims priority to U.S. Provisional Patent Application No. 62/214,541 filed Sep. 4, 2015, the disclosures of which are herein incorporated by reference in their entirety.

TECHNICAL FIELD

The present disclosure relates to a method of minimizing unnecessary measurement result reports from triggering from a terminal in which multiple carriers are integrated to a base station.

BACKGROUND

In order to satisfy increases in demand for wireless data traffic now that a 4G communication system is commercially available, efforts are being made to develop an enhanced 5G communication system or a pre-5G communication system. A 5G communication system or a pre-5G communication system is referred to as a beyond 4G network communication system or a post LTE system. In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and output (MIMO), full dimensional MIMO (FD-MIMO), array antenna, analog beamforming, and large scale antenna have been discussed for the 5G communication system. Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation have been developed. In addition, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, have been developed for the 5G system.

Innovation of the Internet from a human-based connection network in which a human generates and consumes information to an Internet of Things (IoT) network that gives and receives and processes information to and from distributed constituent elements such as things has occurred. Internet of Everything (IoE) technology in which big data processing technology through connection to a cloud server is combined with IoT technology has appeared. In order to implement the IoT, technology elements such as sensing technology, wired and wireless communication and network infrastructure, service interface technology, and security technology are required; thus, nowadays, research is being carried out on technology of a sensor network, Machine to Machine (M2M) communication, and Machine Type Communication (MTC) for connection between things. In an IoT environment, an intelligent Internet technology service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network have been undertaken. For example, technologies such as a sensor network, Machine to Machine (M2M) communication, and Machine Type Communication (MTC) have been implemented by the technique of beamforming, MIMO, and array antenna, which are 5G communication technologies. Application of a cloud RAN as the foregoing big data processing technology may be an example of fusion of 5G technology and IoT technology.

As described above, in order to satisfy wireless data traffic demands, discussions are being held to develop communication methods in various fields. For example, there is terminal-to-terminal communication, a frequency aggregation system for operating a plurality of cells, and a multi-antenna system using a large-scale antenna.

SUMMARY

The present disclosure provides a method of minimizing unnecessary measurement result reports from triggering from a terminal in which multiple carriers are integrated to a base station.

In accordance with an aspect of the present disclosure, a method of reporting measurement of a terminal includes receiving from a base station a measurement setup message instructing measurement of neighboring cells; performing measurement of first cells selected based on the measurement setup message; determining whether to start a measurement reporting procedure according to a measurement result of second cells selected based on the measurement setup message; and generating a measurement report message of third cells selected based on the measurement setup message when start of the measurement reporting procedure is determined and transmitting the measurement report message to the base station.

The second cells may be a portion of the first cells or may correspond to the entirety of the first cells. The third cells may correspond to the entirety of the first cells or may be a portion of the first cells.

The measurement setup message may include measurement target information including a first list and a second list and measurement report setup information instructing whether to start the measurement reporting procedure according to a measurement result of cells included in the second list.

The first cells and the third cells may not be included in the first list, and the second cells may not be included in the first list but may be included in the second list.

The first list may include cells within a first physical cell identity (PCI) range, and the second list may include cells within a second PCI range.

The measurement report message may include PCIs configured to distinguish the third cells, and a reference signal received power (RSRP) signal or a reference signal received quality (RSRQ) signal of the third cells.

In accordance with another aspect of the present disclosure, a method of receiving a measurement report of a base station includes generating a measurement setup message instructing measurement of neighboring cells; transmitting the measurement setup message to a terminal; and performing, by the terminal, measurement of first cells selected based on the measurement setup message and receiving a measurement report message of third cells selected based on the measurement setup message from the terminal when a measurement reporting procedure is started according to a measurement result of second cells selected based on the measurement setup message.

In accordance with another aspect of the present disclosure, a terminal that performs a measurement report includes a transceiver configured to transmit and receive a signal; and a controller configured to control to receive from a base station a measurement setup message instructing measurement of neighboring cells, to perform measurement of first cells selected based on the measurement setup message, to determine whether to start a measurement reporting procedure according to a measurement result of second cells selected based on the measurement setup procedure, to generate a measurement report message of third cells selected based on the measurement setup message when start of the measurement reporting procedure is determined, and to transmit the measurement report message to the base station.

In accordance with another aspect of the present disclosure, a base station that receives a measurement report includes a transceiver configured to transmit and receive a signal; and a controller configured to control to generate a measurement setup message instructing measurement of neighboring cells, to transmit the measurement setup message to a terminal, to perform by the terminal measurement of first cells selected based on the measurement setup message, and to receive a measurement report message of third cells selected based on the measurement setup message from the terminal when a measurement reporting procedure is started according to a measurement result of second cells selected based on the measurement setup message.

A method and apparatus according to embodiments of the present disclosure can minimize a measurement reporting overhead of a terminal in which multiple carriers are integrated by minimizing unnecessary measurement result reports from triggering.

DETAILED DESCRIPTION

Figure 1:
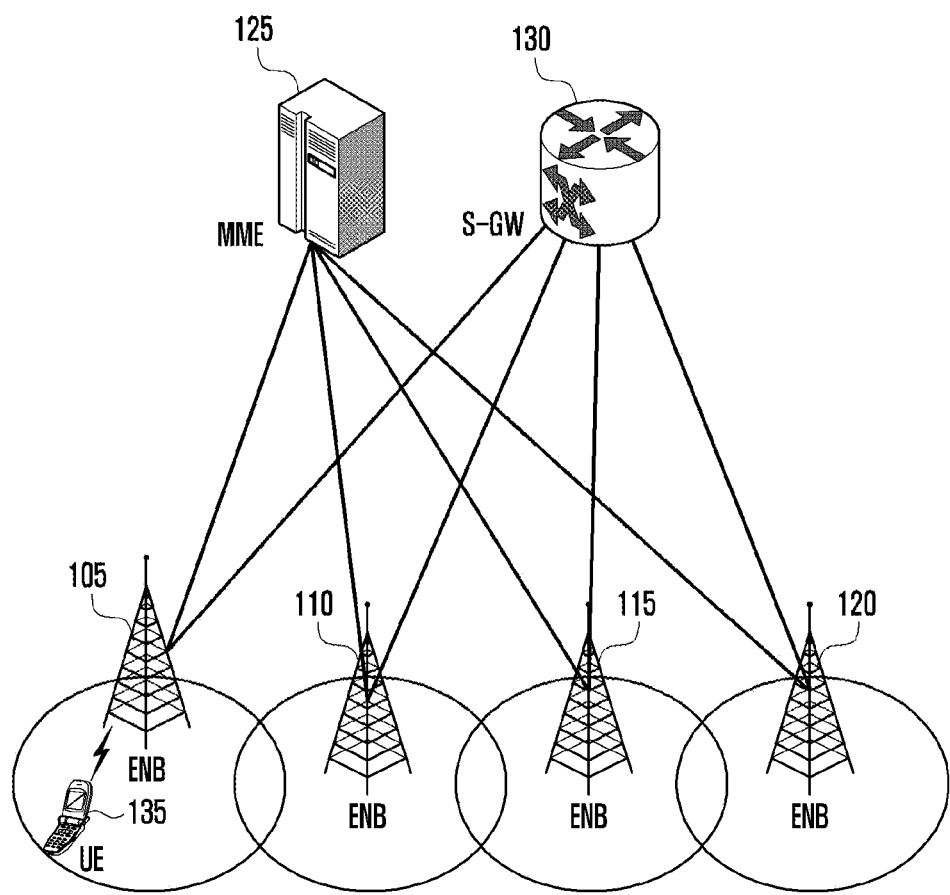
FIG. 1 is a diagram illustrating a structure of an LTE system according to an embodiment of the present disclosure.

Hereinafter, embodiments of the present disclosure will be described in detail with reference to the accompanying drawings. Detailed descriptions of well-known functions and structures incorporated herein may be omitted to avoid obscuring the subject matter of the present disclosure. The terms used herein are defined according to the functions of the present disclosure and may vary depending on a user's or an operator's intension and usage. Therefore, the terms used herein should be understood based on the descriptions made herein.

The present disclosure provides a method and apparatus for reducing a measurement reporting overhead of a terminal in which multiple carriers are integrated. More particularly, the present disclosure provides a method of preventing an unnecessary measurement result report message from being transmitted to and received from a base station by minimizing triggering of an unnecessary measurement result report by a terminal.

Measurement of the terminal is set by the base station and is executed in the terminal. One measurement is specified by a measurement ID (hereinafter, measId); a measurement target to measure is defined; and, when any condition is satisfied, whether to report the measurement result is defined. The measurement target is called a measurement object and is, hereinafter, referred to as a measObject. A measurement result reporting condition is set by a report configuration, and the report configuration is, hereinafter, referred to as reportConfig.

Several measurements may be set to the terminal according to various purposes. According to a purpose of the measurement, it may be preferable to determine whether to trigger a measurement result report in consideration of only a measurement result of a particular neighboring cell.

For example, in order to set a new serving cell to the terminal at a random frequency, the terminal may be set to trigger a measurement result report when a channel quality of the neighboring cell of the random frequency becomes equal to or higher than a predetermined reference. In this case, because cells that can be integrated are cells under the control of the same base station, it is preferable that the terminal does not trigger a measurement result report based on measurement results of cells of another base station.

In the present disclosure, in order to flexibly set, neighboring cells to be measured, neighboring cells affecting triggering of a measurement result report, and neighboring cells to which measurement results are reported in a measurement result report message are classified into the following three sets.

(1) Set 1: The terminal does not perform measurement for the neighboring cells included in set 1 and, when determining whether to trigger a measurement result, neighboring cells of set 1 are excluded (i.e., a measurement result is not evaluated); and the measurement result is not included in the measurement result report message.

Radio waves from a distant cell may be received because of abnormal propagation conditions according to a region, and these cells are included in set 1 because they are not considered in mobility or carrier aggregation.

(2) Set 2: The terminal performs measurement of the neighboring cells included in set 2 and, when determining whether to trigger a measurement result, the neighboring cells of set 2 are considered (i.e., a measurement result is evaluated); and the measurement result is included in the measurement result report message. In other words, set 2 relates to both whether to start the measurement result reporting procedure and reporting of the measurement results.

When it is preferable to trigger a measurement result report only by predetermined cells, as in the foregoing scenario, set 2 includes cells in which measurement result report triggering is available.

(3) Set 3: The terminal performs measurement of neighboring cells included in set 3 and, when determining whether to trigger a measurement result, the terminal does not consider neighboring cells (i.e., a measurement result is not evaluated) of set 3; and, when a predetermined condition is satisfied, the measurement result is included in the measurement result report message. In other words, set 3 is not related to start of the measurement result reporting procedure, but it is related to the measurement result report.

Set 3 is configured with neighboring cells that are not included in set 1 and set 2.

An operation of the terminal for each set may be summarized as follows.

|  | Set 1 | Set 2 | Set 3 |
| --- | --- | --- | --- |
| Measurement Consider when determining whether to a trigger measurement result report | Not perform Not consider | Perform Consider | Perform Not consider |
| Include measurement result in a measurement result report message | Not include | Include | Include when a condition is satisfied |

In order to specify set 1, set 2, and set 3, a first list and a second list are set on a measObject basis.

The first list (black list) contains at least one physical cell identity (PCI) range information, and neighboring cells belonging to a corresponding PCI range belong to set 1. The PCI range (physCellIdRange) is configured with a start PCI identifier and range information. Range information represents the number of cells belonging to the PCI range.

The second list (white list) contains at least one PCI range information, and neighboring cells belonging to a corresponding PCI range belong to set 2.

In this case, the first list and the second list are mutually exclusive. In other words, neighboring cells belonging to the first list cannot be included in the second list, and vice versa.

For set 3, a separate list is not defined, and set 3 is determined by implicit rules as follows.

When the second list is not set for a random measObject, set 3 does not exist for a corresponding measObject.

When the second list is set for a random measObject, set 3 is differently defined according to whether use of the second list is provided in a related reportConfig.

When use of the second list is not provided in a related reportConfig, set 3 is not set to a corresponding measId.

When use of the second list is provided in a related reportConfig, set 3 for a corresponding measId is configured with neighboring cells that do not belong to set 1 and set 2.

The first list (or set 1) is commonly applied to entire measurements. In other words, when the first list is set to a random measObject, even if the measObject is connected to any measId (or even if the measObject is connected to any reportConfig), the first list is always applied (or is always effective).

However, the second list is applied only to measurements satisfying a predetermined condition. In more detail, when the second list is set to a random reportConfig, if information instructing use of a second list is included in a reportConfig connected to the measObject, the second list is effective, but in other cases, the second list is not effective. For example, both the first list and the second list are set to measObject x, information instructing use of the second list is set to reportConfig y, and information instructing use of the second list is not set to reportConfig z.

When measId 1 is connected (related or mapped) to the measObject x and the reportConfig y and when measId 2 is connected to the measObject x and the reportConfig z, the first list is applied to both the measId 1 and measId 2, but the second list is applied only to the measId 1.

In other words, when measuring the measObject x, the terminal performs measurement of cells, except for cells specified in the first list, regardless of whether the measurement is measurement for measId 1 or measId 2.

When determining whether to trigger a measurement result report of measId 1, the terminal considers only a measurement result of cells specified in the second list (or considers only cells specified in the second list as applicable cells) and when determining whether to trigger a measurement result report of measId 2, the terminal considers only a specific result of all cells, except for the cells specified in the first list (or considers all cells, except for cells specified in the first list, as applicable cells).

When a measurement result report of measId 1 is triggered, the terminal generates a measurement result report message. In this case, the terminal includes a result of neighboring cells satisfying a measurement result report triggering condition among neighboring cells belonging to set 2 in the measurement result report message. The terminal includes the predetermined m number of best measurement results among the measurement result of the neighboring cells belonging to set 2 and set 3 in the measurement result report message. As described above, by defining set 1, set 2, and set 3, the terminal may determine flexibly neighboring cells to be measured, neighboring cells affecting measurement results report triggering, and neighboring cells in which measurement result is reported in the measurement result report message. The terminal does not perform measurement of neighboring cells belonging to the first list; and, when determining whether to trigger a measurement result report, the terminal does not include the measurement result in the measurement result report message without considering the measurement result of the cells (when measurement is inadvertently performed). The terminal performs measurement of the neighboring cells belonging to the second list; and, when determining whether to trigger a measurement result report, the terminal may include the measurement result in the measurement result report message in consideration of measurement results of the cell. The terminal performs measurement of the neighboring cells that do not belong to the first list and the second list; and, when determining whether to trigger a measurement result report, the terminal may include the measurement results in the measurement result report message without considering measurement results of the cell. A structure of the LTE system according to an embodiment of the present disclosure will be described with reference to FIG. 1. FIG. 1 is a diagram illustrating a structure of an LTE system according to an embodiment of the present disclosure. With reference to FIG. 1, a radio access network of the LTE system includes Evolved Node Bs (hereinafter, ENB, Node B, or base station) 105, 110, 115, and 120, a mobility management entity (hereinafter, may be referred to as an "MME") 125, and a serving gateway (hereinafter, may be referred to as an "S-GW") 130.

Figure 2:
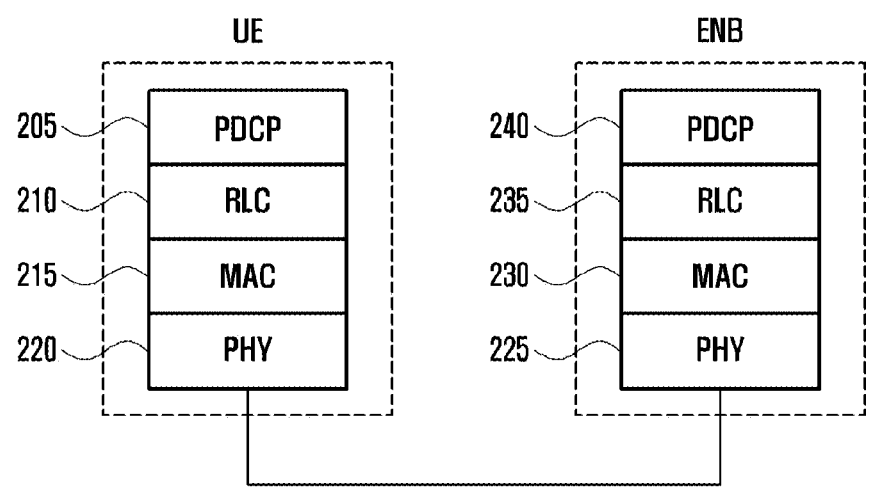
FIG. 2 is a diagram illustrating a radio protocol structure in an LTE system according to an embodiment of the present disclosure.
Figure 3:
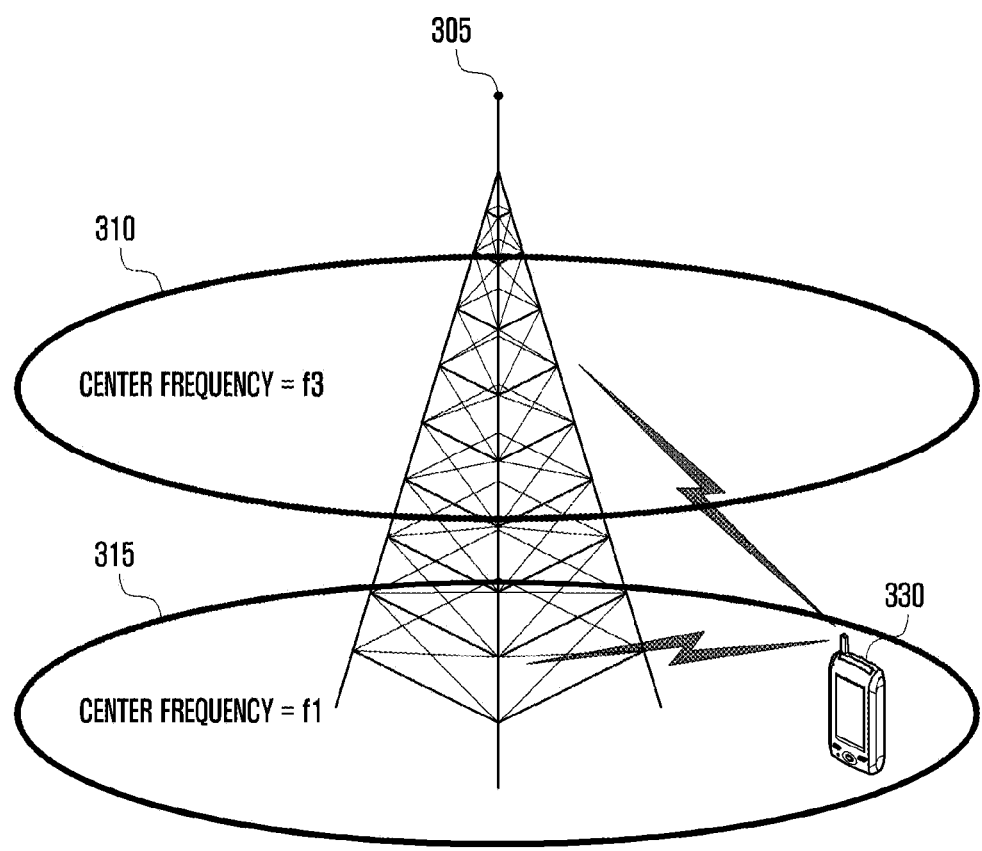
FIG. 3 is a diagram illustrating a carrier aggregation operation within a base station in an LTE system according to an embodiment of the present disclosure.

A user terminal (hereinafter, UE or terminal) 135 may access to an external network through the ENBs 105, 110, 115, and 120 and the S-GW 130. In FIG. 1, the ENBs 105, 110, 115, and 120 correspond to an existing node B of a Universal Mobile Telecommunications system (UMTS). The ENBs 105, 110, 115, and 120 are connected to the UE 135 through a radio channel and perform a more complex function than that of an existing node B. In an LTE system, because all user traffic including a real-time service such as a voice over IP (VoIP) service through an Internet protocol is serviced through a shared channel, a device is required that collects and schedules state information such as a buffer state, an available transmission power state, and a channel state of UEs; and the ENBs 105, 110, 115, and 120 perform the work. One ENB normally controls a plurality of cells. In order to implement a high-speed transmission speed, the LTE system uses an orthogonal frequency division multiplexing (hereinafter, referred to as "OFDM") as a radio access technology in a 20 MHz bandwidth. Further, the ENBs 105, 110, 115, and 120 use an Adaptive Modulation & Coding (hereinafter, referred to as AMC) method that determines a modulation scheme and a channel coding rate according to a channel state of the UE 135. The S-GW 130 is a device that provides data bearers and generates or removes data bearers according to the control of the MME 125. The MME 125 performs various control functions as well as a mobility management function of the UE 135 and is connected to a plurality of eNBs. FIG. 1 illustrates a structure of the LTE system according to an embodiment of the present disclosure, and a radio protocol architecture in the LTE system according to an embodiment of the present disclosure will be described with reference to FIG. 2. FIG. 2 is a diagram illustrating a radio protocol structure in an LTE system according to an embodiment of the present disclosure. With reference to FIG. 2, the radio protocol of the LTE system includes packet data convergence protocol (hereinafter, referred to as a "PDCP") layers 205 and 240, radio link control (hereinafter, referred to as an "RLC") layers 210 and 235, and medium access control (hereinafter, referred to as an "MAC") layers 215 and 230 in the UE and the ENB, respectively. The PDCP layers 205 and 240 perform an operation of Internet Protocol (hereinafter, referred to as an "IP") header compression/decompression, and the RLC layers 210 and 235 reconfigure a PDCP packet data unit (hereinafter, referred to as a "PDU") in an appropriate size to perform an automatic repeat request (hereinafter, referred to as an "ARQ") operation. The MAC layers 215 and 230 are connected to several RLC layer devices included in one UE, and multiplex RLC PDUs to a MAC PDU and demultiplex the MAC PDU to generate the RLC PDUs. The physical layers 220 and 225 perform channel coding and modulation of superordinate layer data, and generate the superordinate layer data into an OFDM symbol to transmit the OFDM symbol through a radio channel, or demodulate OFDM symbols received through a radio channel and perform channel decoding to transmit the OFDM symbols to a superordinate layer. FIG. 3 is a diagram illustrating a carrier aggregation operation in an LTE system according to an embodiment of the present disclosure. With reference to FIG. 3, one eNB may generally transmit and receive multi-carriers over several frequency bands. For example, when a carrier 315 having a forward central frequency of f1 and a carrier 310 having a forward center frequency of f3 are transmitted from an eNB 305, conventionally, one UE transmitted/received data using one carrier of the two carriers. However, the UE having a carrier aggregation capability may simultaneously transmit/receive data through several carriers. By allocating more carriers to a UE 330 having a carrier aggregation capability according to a situation, the eNB 305 may increase a transmission speed of the UE 330.

As described above, aggregation of forward carriers and uplink carriers transmitted and received by one eNB is referred to as "inter-eNB carrier aggregation". However, in some cases, unlike FIG. 3, it may be necessary to aggregate forward carriers and uplink carriers transmitted and received by other eNBs. In a conventional meaning, when one forward carrier transmitted by one eNB and one uplink carrier received by the eNB constitute one cell, carrier aggregation may mean that a UE simultaneously transmits and receives data through several cells. In this case, a maximum transmission speed has a positive correlation with the number of carriers to be aggregated. Hereinafter, in embodiments of the present disclosure, the fact that a UE receives data through a random forward carrier or transmits data through means of a random uplink carrier has the same meaning as a UE transmits/receives data using a center frequency having a characteristic of the carrier and a control channel and a data channel provided in a cell corresponding to a frequency band. In embodiments of the present disclosure, carrier aggregation is particularly expressed as "multiple serving cells are set" and may use terms such as a primary serving cell (PCell) and a secondary serving cell (SCell), or an activated serving cell. The terms have the same meanings as those used in an LTE mobile communication system. It should be noted that in the embodiments of the present disclosure, terms such as a carrier, component carrier, and serving cell are mixed.

Figure 4:
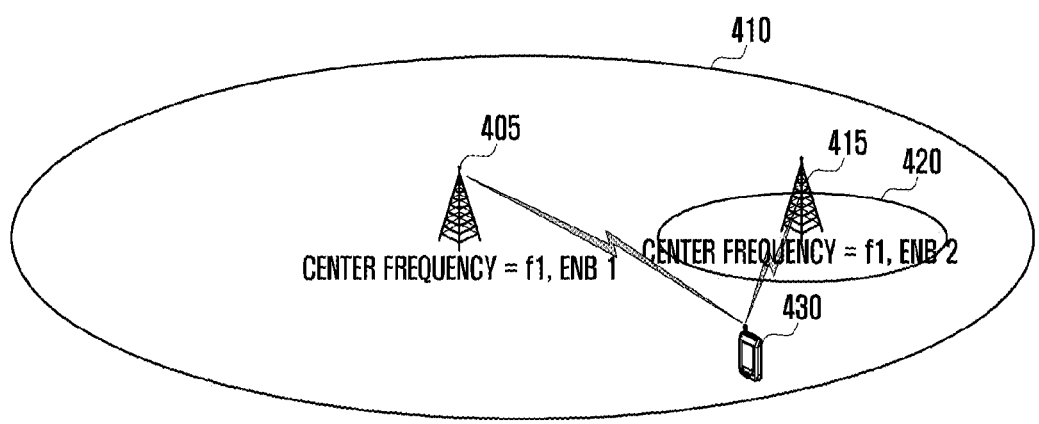
FIG. 4 is a diagram illustrating a carrier aggregation operation between base stations in an LTE system according to an embodiment of the present disclosure.

FIG. 4 is a diagram illustrating a carrier aggregation operation between eNBs in an LTE system according to an embodiment of the present disclosure.

With reference to FIG. 4, when an eNB 1, 405 transmits/receives a carrier having a center frequency of f1 and when an eNB 2, 415 transmits/receives a carrier having a center frequency of f2, if a UE 430 aggregates (combines) a carrier having a forward center frequency of f1 and a carrier having a forward center frequency of f2, one UE may aggregate carriers transmitted/received from two or more eNBs.

In an embodiment of the present disclosure, this is referred to as "inter-ENB carrier aggregation" (or "inter-ENB CA"). In an embodiment of the present disclosure, inter-ENB carrier aggregation is referred to as a dual connectivity (hereinafter, referred to as DC).

For example, the fact that DC is set means that inter-ENB CA is set, that at least one cell group is set, that a secondary cell group (SCG) is set, that at least one secondary cell (hereinafter, referred to as "Scell") under the control of another eNB other than a serving eNB is set, that a primary SCell (pSCell) is set, that a MAC entity for the serving eNB (hereinafter, referred to as "SeNB") is set, and that two MAC entities are set in the UE.

Figure 5:
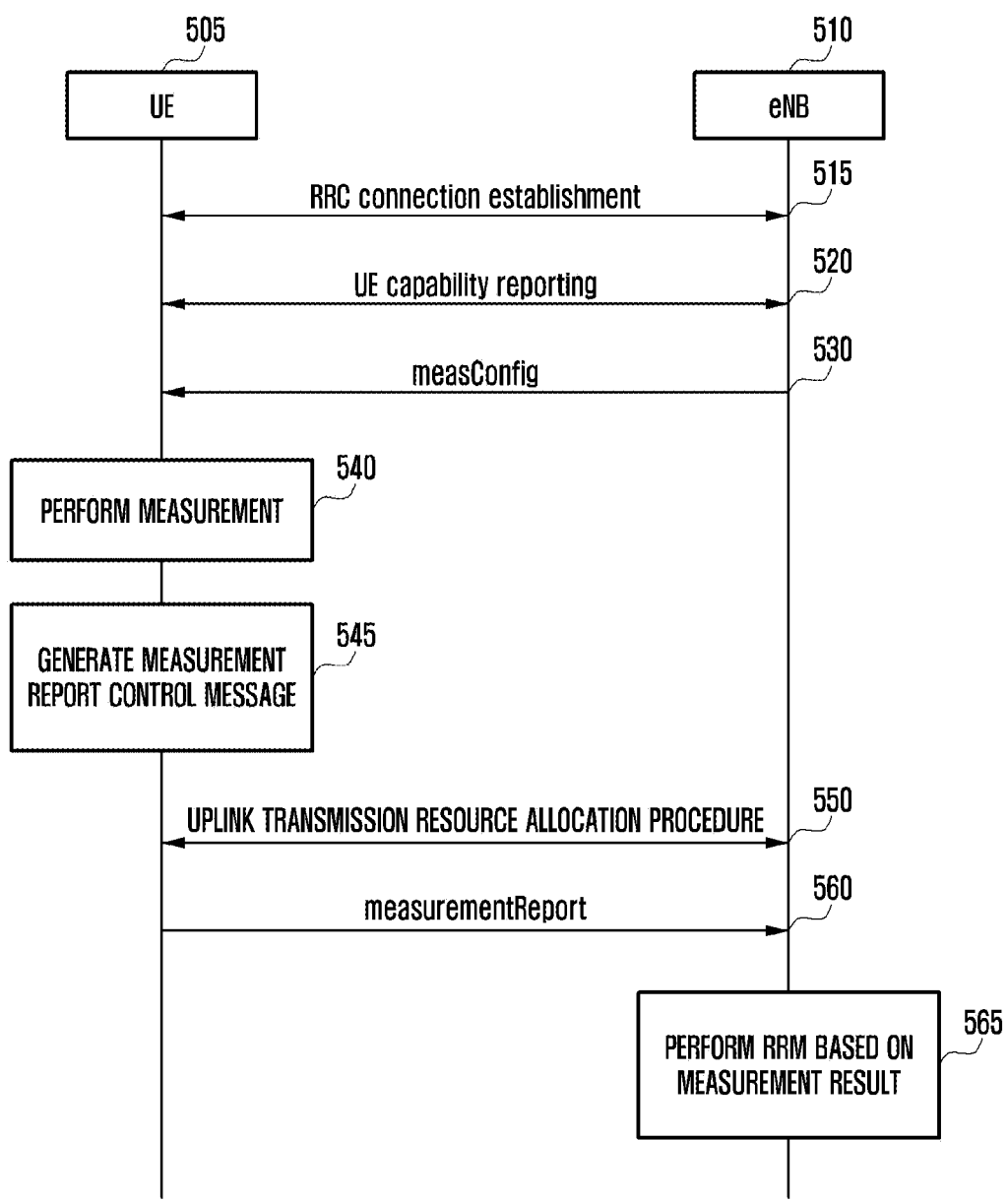
FIG. 5 is a message flow diagram illustrating a method of operating a terminal and a base station according to an embodiment of the present disclosure.

FIG. 5 illustrates an entire operation between a UE and an eNB related to measurement. In a mobile communication system configured with a UE 505, an eNB 510, multiple carriers, and cells, the UE 505 establishes a radio resource control (RRC) connection with the eNB 510 through a random serving cell at step 515. In order to acquire performance information of the UE 505 prior to full-scale communication with the UE 505, the eNB 510 performs a capability reporting procedure with the UE 505 at step 520. The capability reporting procedure includes a step in which the eNB 510 transmits a UECapabilityEnquiry to the UE 505 and in which the UE 505 transmits UECapabilityInformation to the eNB 510.

Through the above process, the UE 505 reports to the eNB 510 a CA performance thereof, for example, band combinations supported by CA and the number of serving cells that can be supported for each band combination. The eNB 510 sets measurement to the UE 505 based on the information at step 530. The measurement may be set for several objects. For example, in order to ensure mobility of the UE 505, it may be configured to continuously measure neighboring cells for a specific frequency or may be configured to measure neighboring cells in a frequency at which CA is available for CA.

The eNB 510 may set at least one measurement to the UE 505, and each measurement is specified by measId. The measurement setup message may include a measObject, reportConfig, etc., and a first list and a second list may be included according to measObject. The reportConfig may include a second list use indicator.

The UE 505 applies predetermined rules to the preset measurement to perform measurement at step 540. The UE 505 determines neighboring cells to exclude from measurement in consideration of the first list.

When a measurement report condition is satisfied for at least one measId, the UE 505 starts a measurement reporting procedure. The UE 505 evaluates measurement results of any cell in consideration of the second list and a second list application indicator and determines whether to start the measurement reporting procedure.

Figure 6:
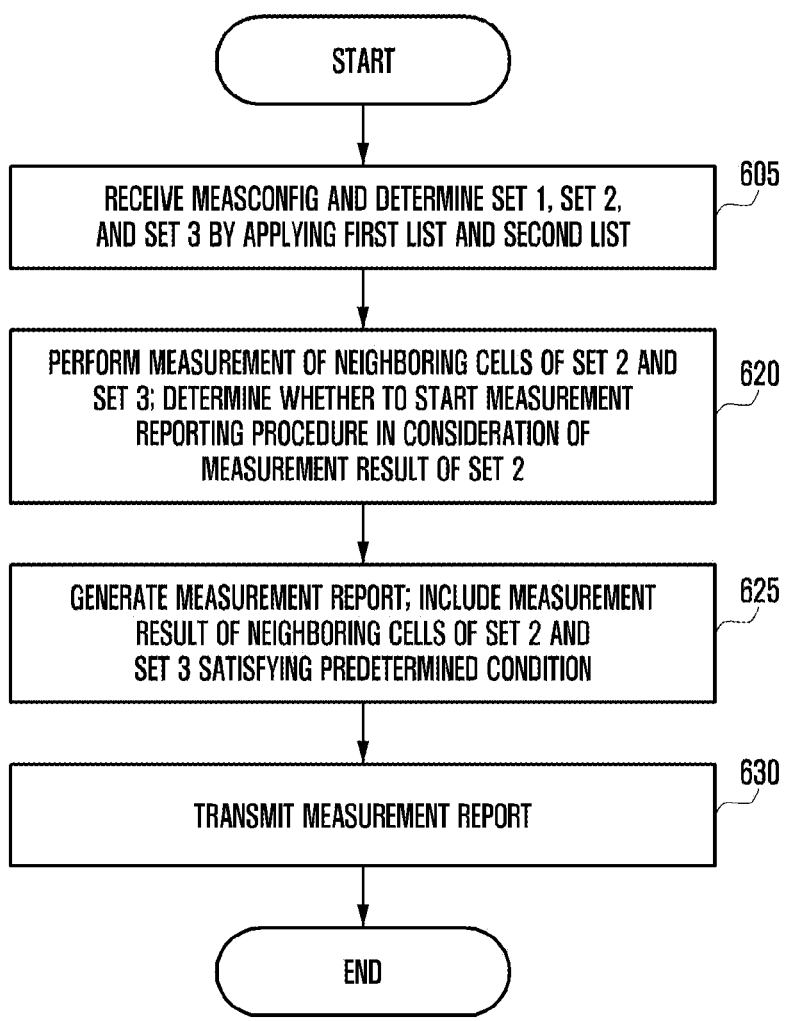
FIG. 6 is a flowchart illustrating a method of operating a terminal according to an embodiment of the present disclosure.

The UE 505 generates a measurement report control message at step 545. The UE 505 determines whether to include measurement results of which cells in the report message in consideration of the first list, measurement results of the measured cells, and the like. When the measurement report control message is complete, the UE 505 requests an uplink transmission resource to the eNB 510 and receives allocation of the uplink transmission resource from the eNB 510 at step 550. The UE 505 transmits a measurement report control message to the eNB 510 at step 560 using the allocated uplink transmission resources. At step 565, the eNB 510, having received the measurement report control message, performs handover of the UE 505 or adds a new serving cell to the UE 505, or replaces a serving cell set to the UE 505 with reference to the measurement result of the measurement report message. FIG. 6 illustrates an operation of a connected state UE for measuring neighboring cells. The UE 505 receives a measConfig at step 605. The measConfig is configured with at least one measObject, at least one reportConfig, and at least one measId.

TABLE 1

| Kind of information | Description |
|---|---|
| Setup information about measurement target | At least one measurement object (measObject) may be set to the UE, and each measurement object is configured with the following information.<br>masObjectId: an identifier for specifying one measurement object when a plurality of measurement objects are set, and one of a first identifier having a value between 1 and 32 and a second identifier having a value between 33 and 64 is used.<br>Carrier Frequency: Information instructing a center frequency of the measurement object<br>First list: specified in Physical Cell Identity (PCI) range.<br>Second list: specified in a PCI range.<br>The first list specifies set 1, and the second list specifies set 2. |
| Information about report setup | At least one "reportConfig" may be set to the UE. Each reportConfig is configured with the following information.<br>reportConfigId: An indicator that specifies one report setting when multiple report settings are set and has a value between 1 and 32.<br>Event type: Information about an event that triggers a measurement report, and events such as A1, A2, A3, A4, and A5 (see specification 36.331) are defined.<br>maxReportCells: The maximum number of cells that may be included in a measurement result report. A measurement result of the serving cell is also included.<br>Second list application indicator: information instructing whether to apply a second list of related measObjects in determining whether to trigger a measurement report. Applying the second list means evaluating only the measurement result of neighboring cells included in the second list and determining whether to trigger the measurement result report.<br>The fact that the second list is not applied means evaluating measurement results of the remaining neighboring cells, except for neighboring cells belonging to the first list, among neighboring cells measured at a frequency specified by the related measObject and determining whether to trigger a measurement result report. |
| Measurement identifier information | One measurement is configured with report setting and a measurement target and is specified by a measurement identifier. For one measurement, measId, reportConfigId, and measObjectId are signaled and they are regarded as |

TABLE 1-continued

| Kind of information | Description |
|---|---|
| | being connected/related/mapped to each other. For example, when measId x, reportConfig y, and measObjectId z define one measurement, the reportConfig y, measObjectId z, and measId x are connected/related/mapped to each other. |

The UE performs measurement at step 620. The UE performs measurement of a measObject that does not require a measurement gap in measurement, performs measurement of a measObject that requires a measurement gap in measurement when the measurement gap has been already set, and reserves measurement of a measObject that requires a measurement gap in the measurement when the measurement gap is not set, among measObjects connected/related/mapped to the measId. The UE performs measurement of the remaining cells, except for neighboring cells belonging to set 1 of the measObject, in performing measurement of a random measObject. That is, the UE performs measurement of cells belonging to set 2 and set 3 and does not perform measurement of cells belonging to set 1. Measurement of a random cell means measurement of received power and a received quality of a reference signal of the cell.

A physical layer of the UE performs measurement of neighboring cells belonging to set 2 and set 3 (or neighboring cells excluding set 1 among measurable neighboring cells) at a predetermined period. The UE transmits a value obtained by processing the measured result values, for example, an average value, to the RRC layer every measurement period, and the RRC layer applies L3 filtering to the measurement result transmitted from the physical layer to calculate s filtered result Fn.

L3 filtering is to weight the measurement result so that the effect decreases as the measurement result becomes longer and is calculated according to the following equation.

$$F_n = (1-a)*F_{n-1} + a*M_n$$

where $M_n$ is the latest received measurement result from the physical layer;

$F_n$ is the updated filtered measurement result, that is used for evaluation of reporting criteria or for measurement reporting;

$F_{n-1}$ is the old filtered measurement result, where F0 is set to M1 when the first measurement result from the physical layer is received; and $a = \frac{1}{2}^{(k/4)}$, where k is the filterCoefficient for the corresponding measurement quantity received by the quantityConfig;

The RRC of the UE determines whether to compare Fn with a predetermined threshold or compare Fn of several cells, i.e., evaluate Fn to trigger the measurement report (or whether to start the measurement reporting procedure). In determining whether to trigger a measurement reporting procedure for any measId, the UE checks whether the second list application indicator is set to True (may be defined to another name such as setup and establish) in the related reportConfig to determine whether to compare a measurement result of which neighboring cell. When the indicator is set to a predetermined value (or when the indicator is included in the reportConfig; the two are used as the same meaning), the UE considers only measurement results of the cells belonging to set 2 to determine whether to start a measurement reporting procedure. Alternatively, cells belonging to set 2 are regarded as applicable cells.

In order to trigger a measurement reporting procedure, a measurement result of at least one applicable cell should satisfy predetermined conditions. When the second list is set and when the second list application indicator is set, the UE regards neighboring cells belonging to the second list as applicable cells. However, when the second list is not set or when the second list is set but the second list application indicator is not set, the UE regards all measurable neighboring cells, except for cells belonging to the first list, as applicable cells. The UE determines whether the applicable cells satisfy an event. That is, when measurement results after layer 3 filtering of at least one applicable cell satisfy an entry condition, the UE triggers a measurement result reporting procedure (i.e., the UE starts the measurement reporting procedure). In other words, when the second list is set and the second list application indicator is set, the UE determines whether to trigger the measurement result reporting procedure considering whether the measurement result of neighboring cells belonging to the second list satisfies a predetermined condition. When the second list is not set or when the second list is set but the second list application indicator is not set, the UE determines whether to trigger the measurement result reporting procedure considering whether the measurement results of the remaining neighboring cells other than cells belonging to the first list satisfy a predetermined condition. As will be described later, once the measurement result reporting procedure is started, even if the cell is a neighboring cell that does not belong to the second list, when the cell satisfies a predetermined condition (a condition that does not belong to the first list and belonging to cells of the m number having a best measurement result, compared with other cells that do not belong to the first list) is satisfied, the UE includes the measurement result in the measurement result report message. The UE generates, at step 625, a measurement result report control message for the measId triggered by the measurement result report process. The measurement result report control message contains measResult, and the measResult contains the following information.

TABLE 2

| Kind of information | Description |
|---|---|
| measId | Related measurement identifier |
| measResultPCell | Measurement results for a PCell; Reference signal received power (RSRP) and reference signal received quality (RSRQ) measured for the reference signal of a PCell are reported. |

TABLE 2-continued

| Kind of information | Description |
| --- | --- |
| MeasResultNeighCells | Measurement information about neighboring cells of the connected measuring object; measurement results of maxReportCells may be included, and one measurement result includes RSRP or RSRQ measured for a reference signal of a corresponding cell and a PCI that specifies neighboring cells.<br>When a second list is set in the measObject and a second list indicator is set in the corresponding reportConfig, the UE includes best m (=maxReportCells) measurement results among neighboring cell measurement result of set 2 and neighboring cell measurement result of set 3 in the measurement information.<br>When the first list and the second list are set to the measObject and the second list indicator is not set to the reportConfig, or<br>when the second list is set to the measObject and the second list indicator is not set to the corresponding reportConfig, the UE includes the best m measurement results among the measurement results of neighboring cells (i.e., neighboring cells of set 2 and set 3), except for neighboring cells of set 1, in the measurement information. |

The UE transmits the measResult to the eNB at step 630.

Figure 7:
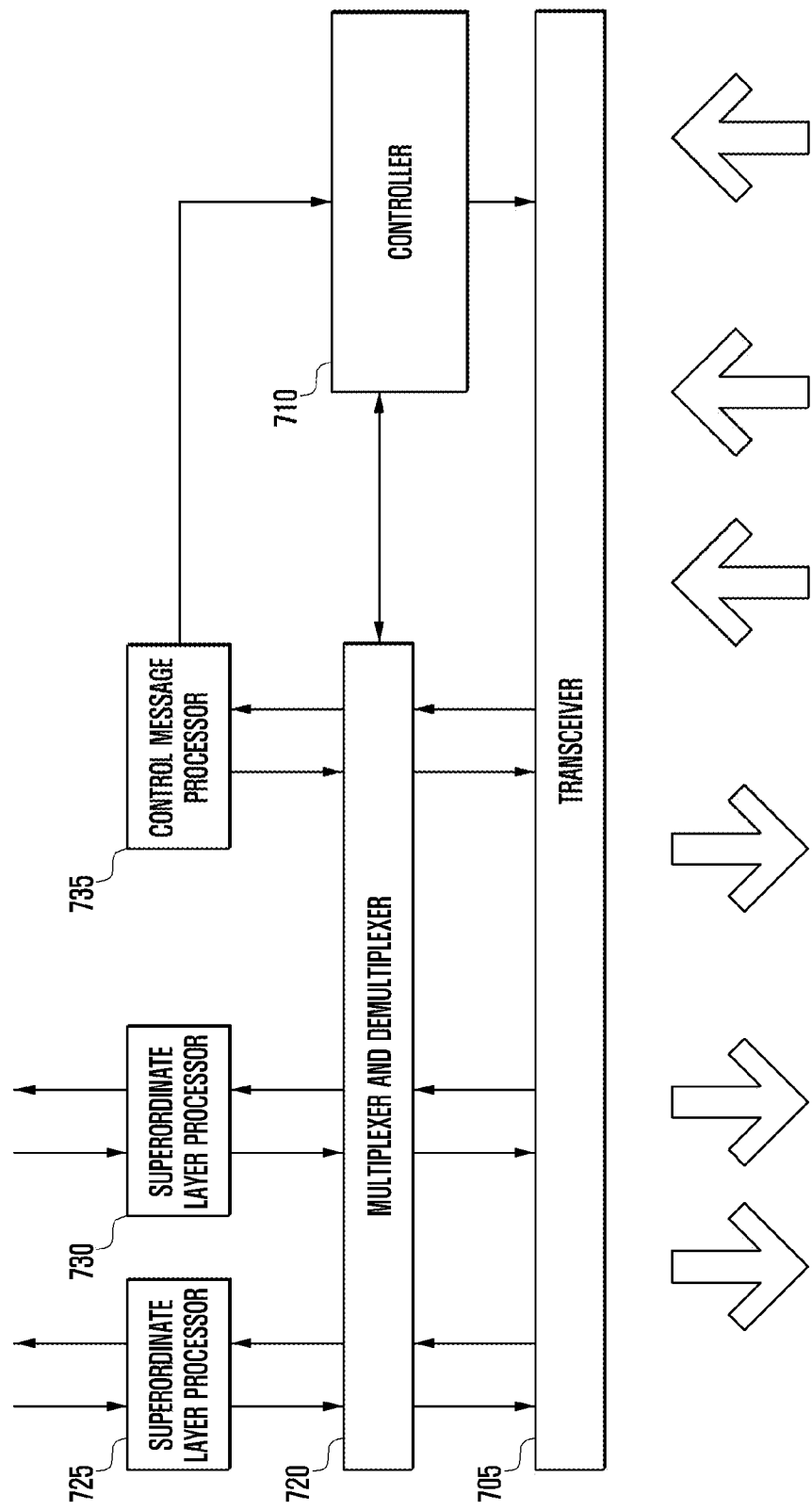
FIG. 7 is a block diagram illustrating a structure of a terminal according to an embodiment of the present disclosure.

FIG. 7 is a block diagram illustrating a configuration of a UE device according to an embodiment of the present disclosure.

With reference to FIG. 7, a UE according to an embodiment of the present disclosure may include at least one of a transceiver 705, controller 710, multiplexer and demultiplexer 720, control message processor 735, and various superordinate layer processors 725 and 730.

The multiplexer and demultiplexer 720 and the controller 710 may configure a MAC device and, in FIG. 7 for convenience, MAC devices are not divided; but, when DC is set, a MAC device for MCG and a MAC device for SCG may be separately configured. The transceiver 705 may receive data and a predetermined control signal with a forward direction channel of a serving cell and transmit data and a predetermined control signal with a backward direction channel. When a plurality of serving cells are set, the transceiver 705 may perform data transmission and reception and control signal transmission and reception through the plurality of serving cells.

The transceiver 705 may include at least one radio frequency circuit/front end (RF circuit/front end), and an operation frequency of the RF circuit/the front end may be set according to the control of the controller 710. The transceiver 705 may perform inter frequency measurement at a predetermined time point according to the control of the controller 710 or may receive a signal from a current serving cell or may transmit a signal to a serving cell at a predetermined time point.

The multiplexer and demultiplexer 720 may perform a function of multiplexing data that has occurred in the superordinate layer processors 725 and 730 or the control message processor 735 or demultiplexing data received in the transceiver 705 to transfer the demultiplexed data to appropriate superordinate layer processors 725 and 730 or the control message processor 735. The control message processor 735 is an RRC layer device and may process a control message received from an eNB to perform a necessary operation. For example, the control message processor 735 may receive an RRC control message to transfer measurement setup information to the controller 710. Further, the control message processor 735 may generate a measurement report control message according to the control of the controller 710 to transfer the measurement report control message to a subordinate layer.

The superordinate layer processors 725 and 730 may be configured on a service basis. The superordinate layer processors 725 and 730 may process data occurring in a user service such as a file transfer protocol (FTP) or a voice over Internet protocol (VoIP) to transfer data to the multiplexer and demultiplexer 720 or may process data transferred from the multiplexer and demultiplexer 720 to transfer the processed data to a service application of a superordinate layer. The controller 710 may determine a scheduling command received through the transceiver 705, for example uplink grant and downlink assignment, to control the transceiver 705 and the multiplexer and demultiplexer 720 to perform uplink transmission or perform downlink reception with an appropriate transmitting resource at an appropriate time point. The controller 710 may perform several control operations of the above-described UE. That is, the controller 710 may control UE operations among operations described with reference to FIGS. 5 and 6.

Figure 8:
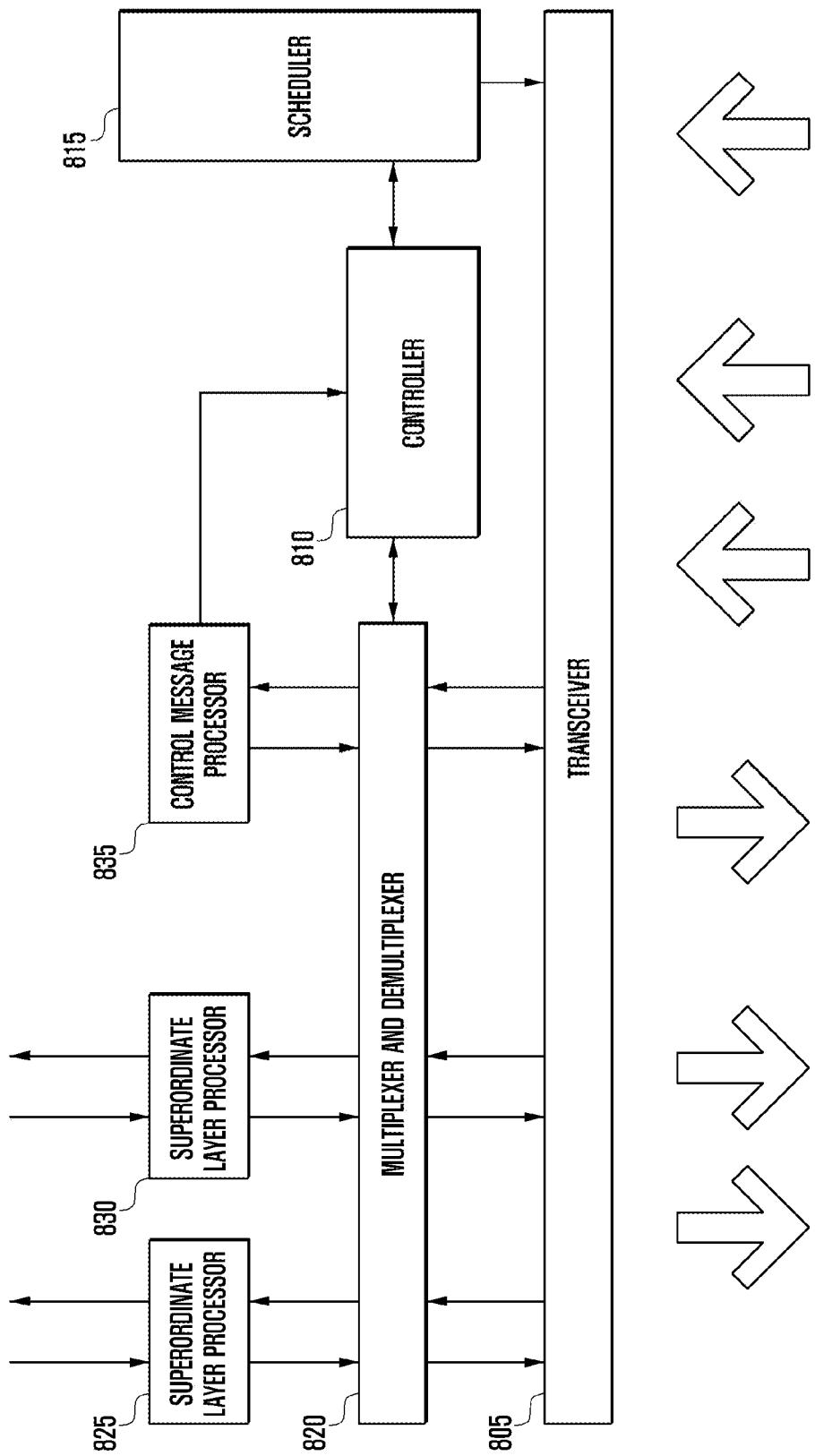
FIG. 8 is a block diagram illustrating a structure of a base station according to an embodiment of the present disclosure.

FIG. 8 is a diagram illustrating a configuration of an eNB device according to an embodiment of the present disclosure. The eNB device may include at least one of a transceiver 805, controller 810, multiplexer and demultiplexer 820, control message processor 835, various superordinate layer processors 825 and 830, and scheduler 815. The transceiver 805 may transmit data and a predetermined control signal with a forward direction carrier or may receive data and a predetermined control signal with a backward direction carrier. When multiple carriers are set, the transceiver 805 may perform data transmission and reception and control signal transmission and reception with the plurality of carriers. The multiplexer and demultiplexer 820 may multiplex data that has occurred in the superordinate layer processors 825 and 830 or the control message processor 835 or may demultiplex data received in the transceiver 805 to transfer the demultiplexed data to appropriate superordinate layer processors 825 and 830, the control message processor 835, or the controller 810. The control message processor 835 may process a control message transmitted by the UE to perform a necessary operation or may generate a control message to transfer to the UE to transfer the control message to a subordinate layer. The superordinate layer processors 825 and 830 may be configured on a bearer basis and configure data transferred from an S-GW or another eNB into an RLC PDU to transfer the RLC PDU to the multiplexer and demultiplexer 820 or may configure an RLC PDU transferred from the multiplexer and demultiplexer 820 into a PDCP SDU to transfer the PDCP SDU to an S-GW or another eNB. The scheduler 815 may assign a transmitting resource to the UE at an appropriate time point in consideration of a buffer state and a channel state of the UE and process a signal transmitted by the UE to the transceiver 805 or may process to transmit a signal to the UE. The controller 810 may perform general operations related to the above-described measurement and wireless resource control. That is, the controller 810 may control eNB operations among operations described with reference to FIGS. 5 and 6.

What is claimed is:

1. A method of reporting measurement of a terminal, the method comprising:
    receiving from a base station a measurement setup message instructing measurement of neighboring cells;
    performing measurement of first cells selected based on the measurement setup message, wherein the first cells are neighboring cells to be measured;
    determining whether to start a measurement reporting procedure according to a measurement result of second cells selected based on the measurement setup message, wherein the second cells are neighboring cells for triggering the measurement reporting procedure; and
    generating a measurement report message of third cells selected based on the measurement setup message when start of the measurement reporting procedure is determined and transmitting the measurement report message to the base station, wherein the third cells are neighboring cells included in the measurement report message.

2. The method of claim 1, wherein the second cells are a portion of the first cells or correspond to the entirety of the first cells.

3. The method of claim 1, wherein the third cells correspond to the entirety of the first cells or are a portion of the first cells.

4. The method of claim 1, wherein the measurement setup message comprises measurement target information comprising a first list and a second list and measurement report setup information instructing whether to start the measurement reporting procedure according to a measurement result of cells included in the second list.

5. The method of claim 4, wherein the first cells and the third cells are not included in the first list, and
    the second cells are not included in the first list but are included in the second list.

6. The method of claim 4, wherein the first list includes cells within a first physical cell identity (PCI) range, and
    the second list includes cells within a second PCI range.

7. The method of claim 1, wherein the measurement report message comprises PCIs configured to distinguish the third cells, and a reference signal received power (RSRP) signal or a reference signal received quality (RSRQ) signal of the third cells.

8. A method of receiving a measurement report of a base station, the method comprising:
    generating a measurement setup message instructing measurement of neighboring cells;
    transmitting the measurement setup message to a terminal to enable the terminal to conduct a measurement of first cells selected based on the measurement setup message, wherein the first cells are neighboring cells to be measured; and
    receiving a measurement report message of third cells selected based on the measurement setup message, from the terminal when a measurement reporting procedure is started according to a measurement result of second cells selected based on the measurement setup message, wherein the second cells are neighboring cells for triggering the measurement reporting procedure and the third cells are neighboring cells included in the measurement report message.

9. The method of claim 8, wherein the second cells are a portion of the first cells or correspond to the entirety of the first cells, and
    the third cells correspond to the entirety of the first cells or are a portion of the first cells.

10. The method of claim 8, wherein the measurement setup message comprises measurement target information comprising a first list and a second list and measurement report setup information instructing whether to start the measurement reporting procedure according to a measurement result of cells included in the second list.

11. The method of claim 10, wherein the first cells and the third cells are not included in the first list, and
    the second cells are not included in the first list but are included in the second list.

12. A terminal that performs a measurement report, the terminal comprising:
    a transceiver; and
    a controller coupled with the transceiver and configured:
        to receive from a base station a measurement setup message instructing measurement of neighboring cells,
        to perform measurement of first cells selected based on the measurement setup message, wherein the first cells are neighboring cells to be measured,
        to determine whether to start a measurement reporting procedure according to a measurement result of second cells selected based on the measurement setup message, wherein the second cells are neighboring cells for triggering the measurement reporting procedure,
        to generate a measurement report message of third cells selected based on the measurement setup message when start of the measurement reporting procedure is determined, wherein the third cells are neighboring cells included in the measurement report message, and
        to transmit the measurement report message to the base station.

13. The terminal of claim 12, wherein the measurement setup message comprises measurement target information comprising a first list and a second list, and measurement report setup information instructing whether to start the measurement reporting procedure according to a measurement result of cells included in the second list, and
    wherein the first cells and the third cells are not included in the first list, and the second cells are not included in the first list but are included in the second list.

14. A base station that receives a measurement report, the base station comprising:
    a transceiver; and
    a controller coupled with the transceiver and configured:
        to generate a measurement setup message instructing measurement of neighboring cells, to transmit the measurement setup message to a terminal to enable the terminal to conduct a measurement of first cells selected based on the measurement setup message, wherein the first cells are neighboring cells to be measured, and to receive a measurement report message of third cells selected based on the measurement setup message, from the terminal when a measurement reporting procedure is started according to a measurement result of second cells selected based on the measurement setup message, wherein the second cells are neighboring cells for triggering the measurement reporting procedure and the third cells are neighboring cells included in the measurement report message.

15. The base station of claim 14, wherein the measurement setup message comprises measurement target information comprising a first list and a second list, and measurement report setup information instructing whether to start the measurement reporting procedure according to a measurement result of cells included in the second list, and
wherein the first cells and the third cells are not included in the first list, and the second cells are not included in the first list but are included in the second list.

* * * * *